US012743293B2

(12) United States Patent
Hua et al.

(10) Patent No.: US 12,743,293 B2
(45) Date of Patent: Sep. 22, 2026

(54) METHOD AND SYSTEM FOR RESOURCE MODIFICATION OF VIRTUAL DEVICES BASED ON PROSPECTIVE NETWORK LOAD CRITERION VALUE

(71) Applicant: Verizon Patent and Licensing Inc., Basking Ridge, NJ (US)

(72) Inventors: Suzann Hua, Beverly Hills, CA (US); Parry Cornell Booker, Sunnyvale, TX (US); Emerando M. Delos Reyes, Pleasant Hill, CA (US); Chien-Yuan Huang, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 734 days.

(21) Appl. No.: 17/828,173

(22) Filed: May 31, 2022

(65) Prior Publication Data

US 2023/0385095 A1 Nov. 30, 2023

(51) Int. Cl.
*G06F 9/455* (2018.01)

(52) U.S. Cl.
CPC .. *G06F 9/45558* (2013.01); *G06F 2009/4557* (2013.01); *G06F 2009/45587* (2013.01); *G06F 2009/45595* (2013.01)

(58) Field of Classification Search
CPC ........... G06F 9/4555; G06F 2009/4557; G06F 2009/45587; G06F 2009/45595; G06F 9/45558
See application file for complete search history.

(56) References Cited

U.S. PATENT DOCUMENTS

| | | | | |
|---|---|---|---|---|
| 8,352,608 B1 * | 1/2013 | Keagy | G06F 9/45558 709/225 |
| RE48,680 E * | 8/2021 | Yemini | G06Q 10/06 |
| 2014/0215080 A1 * | 7/2014 | Alabiso | H04L 41/5051 709/226 |
| 2015/0063354 A1 * | 3/2015 | Sonoda | H04L 45/74 370/392 |
| 2017/0315838 A1 * | 11/2017 | Nidugala | H04L 43/0817 |
| 2021/0019162 A1 * | 1/2021 | Viswanathan | G06F 9/5033 |
| 2021/0191751 A1 * | 6/2021 | Park | G06F 9/5077 |
| 2021/0303328 A1 * | 9/2021 | Soppin | G06F 9/5005 |
| 2021/0406086 A1 * | 12/2021 | Shivanna | G06F 9/505 |
| 2022/0117015 A1 * | 4/2022 | DeFoy | H04W 76/11 |
| 2022/0150723 A1 * | 5/2022 | Tsai | H04W 24/02 |
| 2022/0206873 A1 * | 6/2022 | He | G06F 9/4881 |
| 2022/0255731 A1 * | 8/2022 | Modica | H04L 9/085 |
| 2024/0137411 A1 * | 4/2024 | Hu | H04L 67/1025 |
| 2024/0196252 A1 * | 6/2024 | Soldati | H04W 24/10 |

* cited by examiner

*Primary Examiner* — Zujia Xu

(57) ABSTRACT

A method, a device, and a non-transitory storage medium are described in which an capacity modification service is provided in relation to a virtual device. The capacity modification service may include a first virtual device of a host device that is able to a receive resource modification request directed to a second virtual device of the host device. The modification request may be received via user interface or application programming interface associated with the first and second virtual devices. The first virtual device may calculate resource values for resources of the prospective resource modification. The first virtual device may communicate the resource values to management layer of the host device, such as a container orchestrator. The container orchestrator may allocate the resources for the second virtual device based on the resource values.

20 Claims, 7 Drawing Sheets

METHOD AND SYSTEM FOR RESOURCE MODIFICATION OF VIRTUAL DEVICES BASED ON PROSPECTIVE NETWORK LOAD CRITERION VALUE

BACKGROUND

Development and design of networks present certain challenges from a network-side perspective and an end device perspective. For example, Next Generation (NG) wireless networks, such as Fifth Generation New Radio (5G NR) networks are being deployed and under development. Virtualized systems may be used in various types of networks, such as a radio access network, a core network, an application layer network, and/or another type of network. For example, network function virtualization technologies may be used in a network to provide an application or a service to an end user, provide a core network function (NF), a radio access NF, or another network-related function.

DETAILED DESCRIPTION

Figure 1:
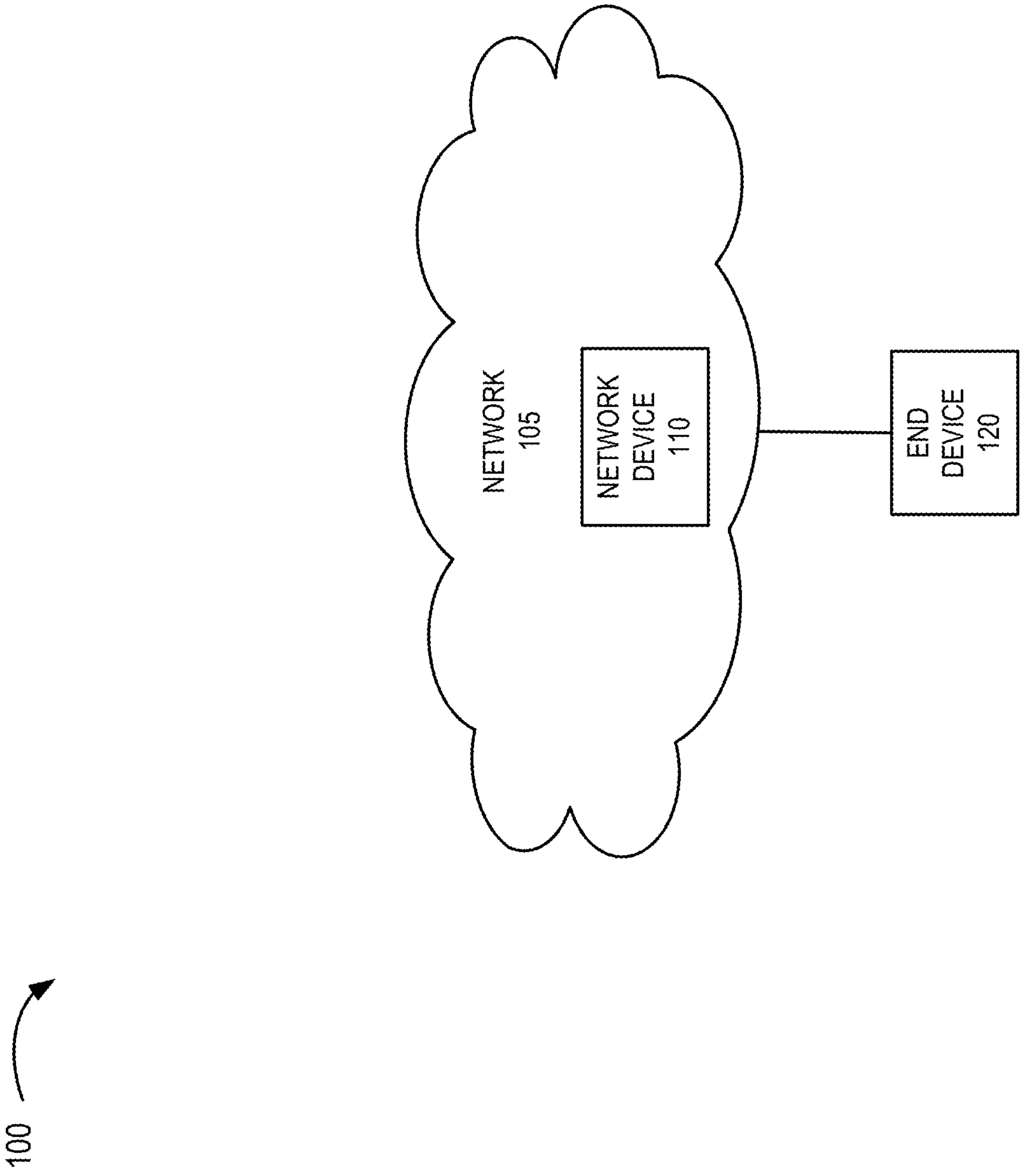
FIG. 1 is a diagram illustrating an exemplary environment in which an exemplary embodiment of a capacity modification service may be implemented.

The following detailed description refers to the accompanying drawings. The same reference numbers in different drawings may identify the same or similar elements. Also, the following detailed description does not limit the invention.

Container-based virtualization allows multiple isolated user space instances to use a Kernel space within an operating system (OS). The user space instances may be referred to as a container. A container may operate on top of bare metal or a virtualization layer formed of components such as a hypervisor, etc. Typically, each container shares the same OS kernel, and keeps applications, runtimes, and various other services separated from other containers using various kernel features.

Fifth Generation (5G) core NF capacity is generally planned based on network subscriber growth forecasting. The capacity growth allocations are provisioned via the 5G core NF's underlying platform infrastructure. The 5G core underlying platform infrastructure can support reactive capacity adjustment based on real-time traffic carried by the NF. However, a reactive capacity adjustment is based on a preconfigured and allowed expanding budget that may not be able to accommodate a requested modification. In addition, the reactive capacity adjustment can lag network traffic needs. For example, the reactive capacity adjustment may happen when the NF is already in an overloaded state where messages have been discarded. On the other hand, proactive NF capacity modification may offer the best and optimal operation conditions as well as seamless user experience. Proactive NF capacity modification may be used in situations where an increase in traffic is expected, such as due to a scheduled big event (e.g., Super Bowl, etc.), a natural disaster forecast (e.g., hurricane, wildfire, etc.), or localized subscriber increase due to service provider's network acquisition or merger.

Under current approaches, there is no means to proactively and directly initiate NF capacity modification via the NF's graphical user interface (GUI) or the NF's Representational State Transfer (REST) application programming interface (API). Rather, a capacity modification would use a completely separate communication path to the underlying platform environment. For example, an authorized administrator or engineer may access and configure a container orchestrator via a different interface or an interface that provides access to the underlying platform environment. In this regard, the NF's GUI or REST API is restricted to configuring the microservices of the NF and not the underlying resources (e.g., memory, processor, communication interfaces, storage, etc.) and associated number of microservices, pods, containers, and/or the like.

According to exemplary embodiments, a capacity modification service is described. According to an exemplary embodiment, the capacity modification service may provide a microservice that supports communication with the underlying platform environment. According to an exemplary embodiment, a network administrator may request an increase or a decrease in NF capacity. The modification request may be received by the microservice via the NF's GUI or REST API. The microservice may calculate the capacity modification based on the modification request.

According to various exemplary embodiments, the modification request may request an increase in capacity, a decrease in capacity, provide a schedule for the modification (e.g., start and stop times), and/or permit the modification to remain until a new or subsequent modification request is received. According to an exemplary embodiment, a minimum lead time for the modification request may be implemented to ensure that resources can be secured to satisfy the request. The modification request may include information indicating a name, address, and/or an identifier of the microservice, container, pod, NF, and/or other virtual entity to which the modification request pertains.

According to an exemplary embodiment, the microservice may include security features, such as authentication and/or authorization to access the capacity modification service. According to various exemplary embodiments, the microservice may be dedicated with an NF instance or may be shared among multiple NF instances. According to a shared architecture, the NFs may support the same traffic model, capacity calculation formula, and the same underlying platform.

According to an exemplary embodiment, the underlying platform may support the requested amount of resources as well as maintain a minimum amount of reserves. For example, the NF resources (e.g., memory, storage, communication interface, processor, etc.) requested may not exceed a resource configuration limit.

In view of the foregoing, the capacity modification service may enable capacity modification of resources for NFs via the NF's GUI or REST API. The capacity modification service may support an on-demand and proactive capacity modification for various types of NFs, such as core NFs, RAN NFs, application layer NFs, end devices, and the like.

FIG. 1 is a diagram illustrating an exemplary environment 100 in which an exemplary embodiment of the capacity modification service may be implemented. As illustrated, environment 100 includes a network 105 that includes a network device 110. Environment 100 also includes an end device 120.

According to other embodiments, environment 100 may include additional devices and/or different types of devices than those illustrated and described herein. According to other exemplary embodiments, environment 100 may include additional networks and/or different networks than those illustrated and described herein.

Environment 100 includes communication links between network devices, and between end device 120 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Network 105 includes one or multiple networks of one or multiple types and technologies. For example, network 105 may include an access network (e.g., a radio access network (RAN)), a core network, an external network, a local area network (LAN), a metropolitan area network (MAN), a wide area network (WAN), a wireless network, a wired network, an optical network, a backhaul network, a mobile network, a service or an application-layer network, the Internet, the World Wide Web (WWW), an Internet Protocol Multimedia Subsystem (IMS) network, a cloud network, a packet-switched network, a data center, a service provider network, a mobile or multi-access edge computing (MEC) network, a fog network, an Ethernet network, a public network, a private network, or another type of network.

According to an exemplary embodiment, network 105 provides access to network device 110. Network device 110 may be a virtualized network device that includes logic that provides the capacity modification service, as described herein. A network device, a network element, or a network function is referred to herein simply as a network device.

The virtualization of network device 110 may be implemented based on a virtual container-based environment, a virtual machine, a hypervisor, and/or another virtualization technology. Network device 110 may also include logic that provides a network service or function. For example, in a 5G core network, network device 110 may be implemented as a virtualized user plane function (UPF) or another type of 5G core virtual network device (e.g., a virtual access and mobility management function (AMF), a virtual session management function (SMF), a virtual network exposure function (NEF), etc.) that includes microservices that provide UPF functionality or another core network functionality (e.g., SMF functionality, AMF functionality, etc.) and also a microservice that provides the capacity modification service, as described herein. According to another example, in a 5G RAN, network device 110 may be implemented as a virtualized next generation Node B (gNB) that includes microservices that provide gNB functionality and a microservice that provides the capacity modification service, as described herein. While a 5G core network or a 5G RAN are illustrative, the capacity modification service may be implemented in future generation (e.g., 5.5G, sixth generation (6G), seventh generation (7G), etc.) core and/or radio access networks.

According to still another example, network device 110 may be implemented as a virtualized server device that provides an end device application service, such as ultra-reliable communications (e.g., automated traffic control and driving, collaborative robots, health-related services (e.g., monitoring, remote surgery, etc.), drone delivery, public safety, etc.), broadcast-like services, communication services, Web services, video streaming, and/or other types of wireless and/or wired application services and includes a microservice that provides the capacity modification service. According to even other examples, network device 110 may be implemented to include other types of application services or provide other types of functions. For example, network device 110 may provide network-related functions pertaining to security, authentication and authorization, network polices, subscriber profiles, routing, and/or other types of services that facilitate the operation of network 105.

Network device 110 may include one or multiple virtualized devices. Network device 110 may include or host various physical resources, such as memory, storage, processor, communication interface (e.g., transmitter, receiver, etc.), and/or other types of hardware and software (e.g., OS, kernel, or the like) upon which the virtualized device is executed. According to an exemplary embodiment, network device 110 includes a component that provides the capacity modification service, as described herein. For example, in a container environment, the component may be implemented as a microservice. For the sake of description, the microservice may be referred to as a capacity modification microservice. A further description of network device 110 is provided herein.

End device 120 is a device that may be used to generate and transmit capacity modification requests to network device 110. For example, a network administrator or other type of personnel (not illustrated) may use end device 120 to modify the capacity/resources of network device 110 in a proactive and on-demand manner. End device 120 may include a client application or another type of software or network administrative tool that enables communication to the capacity modification microservice via the GUI or REST API of network device 110. End device 120 may be implemented as a computer or another type of end user device.

Figure 2:
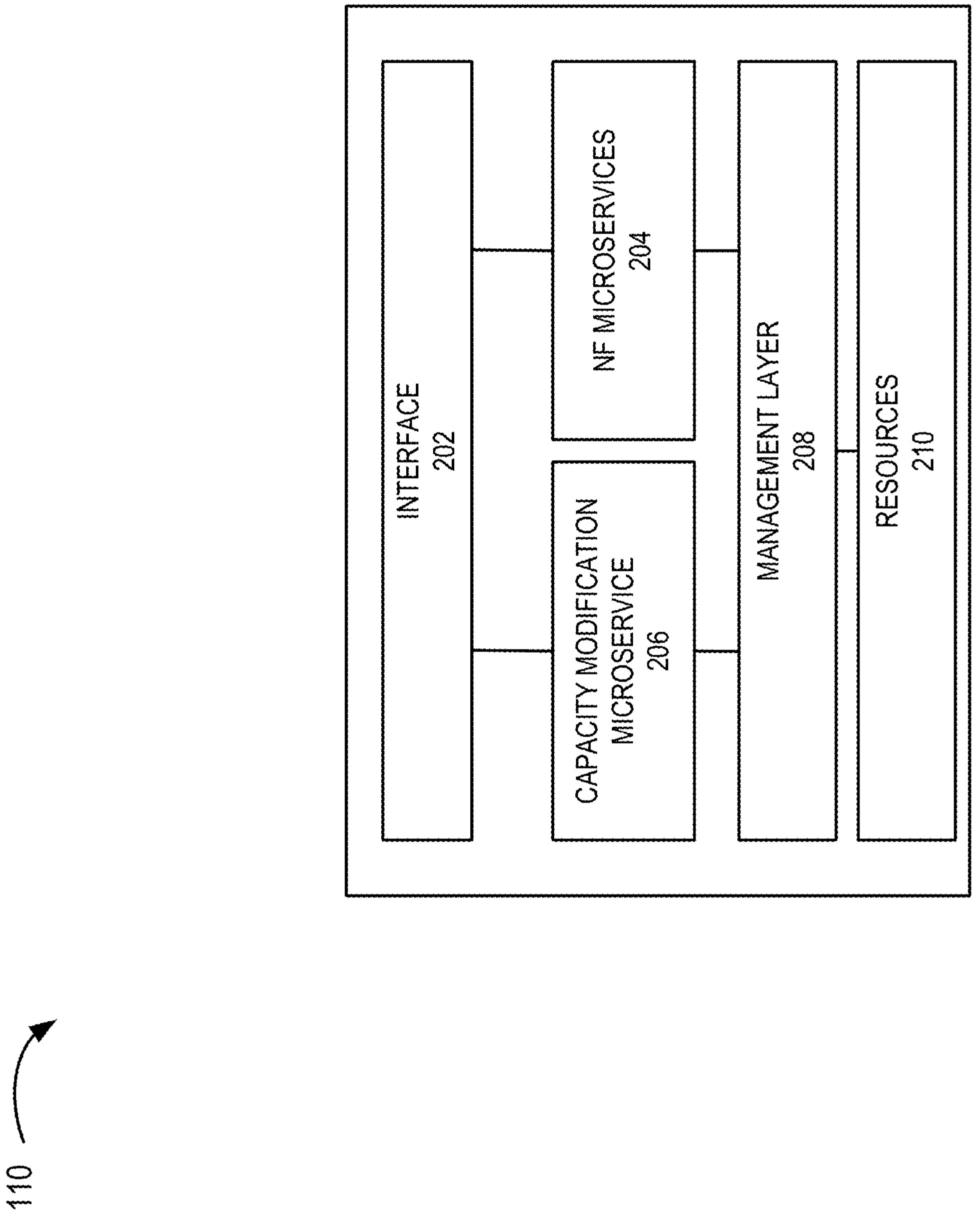
FIG. 2 is diagram illustrating exemplary components of an exemplary embodiment of a device that may provide the capacity modification service.

FIG. 2 is a diagram illustrating exemplary components of an exemplary embodiment of the capacity modification service implemented on network device 110. As illustrated, network device 110 may include or host an interface 202, an NF microservice 204, a capacity modification microservice 206, a management layer 208, and physical resources 210. According to other exemplary embodiments, network device 110 may include additional and/or different components. According to other exemplary embodiments, network device 110 may include additional, fewer, and/or different components in support of virtualization. For example, there are numerous known technologies and/or architectures (e.g., Docker, LXC, Kubernetes, and others) that provide microservice/container virtualization which may be implemented consistent with the capacity modification service, as described herein. This description is not intended to provide an exhaustive treatment of such technologies and/or architectures.

Interface 202 may include logic that allows a user to configure an NF, a node, a pod, or a microservice of network device 110. For example, interface 202 may include a GUI or a REST API. Interface 202 may provide a security service (e.g., authentication, authorization, and/or the like) and may afford a secure connection (e.g., Hypertext Transfer Protocol Secure (HTTPS), use of client credentials, certificates, or the like) between interface 202 and end device 120, for example. Interface 202 may be configured to receive requests that configure and/or manage NF microservices 204 and receive requests directed to capacity modification microservice 206, as described herein. For example, interface 202 may be implemented to include an API server. The API server or another type of server may provide a connection to the node, the pod, the microservice, the NF, the container, or the like.

NF Microservices 204 may include one or multiple microservices relating to the NF of network device 110. For example, NF microservices 204 may include the software or application(s) to provide a core network function (e.g., a UPF, an SMF, an AMF, etc.) or a radio access network function (e.g., a gNB, an evolved Node B (eNB), a RAN Intelligent Controller (RIC), etc.) in whole or in part. NF microservices 204 may be run in one or multiple containers, for example.

Capacity modification microservice 206 may include a microservice that allows, via a modification request and interface 202, to modify and/or manage the amount of resources allocated to another microservice, container, pod, and/or NF, such as NF microservice 204. According to an exemplary embodiment, capacity modification microservice 206 may calculate a resource allocation based on the modification request. For example, the modification request may include information that indicates an amount of traffic, a number of sessions (e.g., PDU sessions), a number of connections (e.g., PDN connections), and/or another type of network load criterion or indicator. Capacity modification microservice 206 may provide a security service (e.g., authentication, authorization, and/or the like) for access and use of the capacity modification service, as described herein. For example, a user (e.g., a network administrator, etc.) may provide credentials (e.g., username, password, etc.) to be validated by microservice 206.

According to an exemplary embodiment, capacity modification microservice 206 may calculate a corresponding amount of resources (e.g., memory, storage, processor, communication interface, etc.) based on the prospective network load criterion or indicator. For example, capacity modification microservice 206 may perform a calculation based on a formula or based on a lookup table that maps or correlates a network load criterion to resource values associated with resources (e.g., processor, memory, storage, buffer, communication interface, etc.). According to various exemplary embodiments, the resource value for a resource may be a single value (e.g., 50 Terabytes) or a range of values (e.g., minimum value and maximum value), such as about 45 Terabytes-60 Terabytes. According to some exemplary embodiments, capacity modification microservice 206 may select a resource value based on a resource configuration limit. For example, when a range of resource values is available, capacity modification microservice 206 may account for a minimum amount of reserve resources to be maintained or sustained. By way of further example, the capacity modification service may include a configurable value (e.g., X % less of 100% of resource capacity) that may be allocated.

As previously mentioned, the modification request may include other types of information (e.g., schedule (e.g., re-occurring, one-time, etc.), start time and/or stop time, etc.), a name, an identifier, and/or a network address of a container, an NF, a pod, a node, and/or the like, as described herein. According to an exemplary embodiment, capacity modification microservice 206 may provide a request, which may include the calculated resource allocation for each resource, to management layer 208. According to an exemplary embodiment, the request may include a prospective schedule, time period, or start/stop time information (e.g., date(s) and time) relating to the capacity/resource modification. According to an exemplary embodiment, the request may indicate that the capacity/resource modification is open (e.g., no stop time) and may remain in effect until a new request is received. According to an exemplary embodiment, the request may include a name, identifier, and/or a network address of the container, the NF, the pod, the node, and/or the like to which the request pertains.

Management layer 208 may include a platform or container orchestrator that allows for the provisioning and deployment of containers, lifecycle management of containers, and the running of containers. For example, management layer 208 may define what container image provides an application, an NF, or a microservice, may define and secure a network connection between containers, may specify versioning (e.g., for phased or canary rollouts), may provision containers with resources, manage scalability (e.g., up/down), load balancing, resource allocation among containers, relocate a container to another host, collect and store log data and other types of telemetry information that may be used to monitor the health and performance of the container/application/NF, among other features.

According to an exemplary embodiment, management layer 208 may be configured to receive a request for capacity modification from capacity modification microservice 206, as described herein. According to an exemplary embodiment, management layer 208 may allocate resources (e.g., increase, decrease, etc.) of resources 210 according to the request. According to an exemplary embodiment, management layer 208 may reserve resources 210 based on a time period during which the resource modification is to be provided. According to an exemplary embodiment, management layer 208 may increase or decrease the number of the same microservices, pods, containers, or the like that may support or provide an NF based on the modification of resources 210. According to another exemplary embodiment, management layer 208 may increase or decrease resources 210 allocated to a current set of microservices, pods, containers, or the like for example.

Resources 210 may include various types of physical resources and/or hardware, such as for example, a processor, a memory, a communication interface (e.g., transmitter, receiver, buffer, port), a storage device (e.g., a hard drive, etc.), and the like. Resources 210 may further include software, such as an operating system, a kernel, an application that provides a microservice and/or a NF, and/or another software element, for example.

Figure 3A:
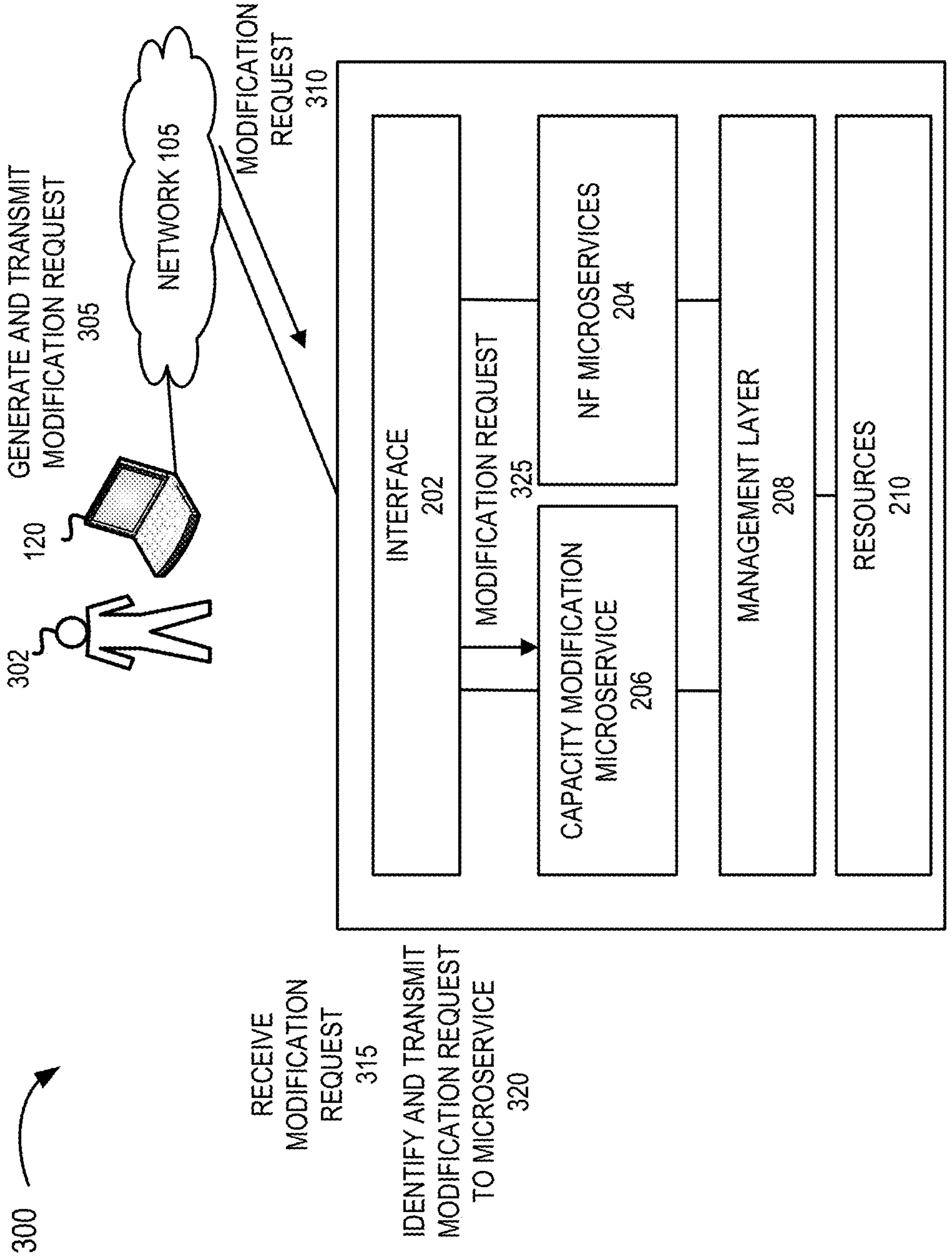
FIGS. 3A-3C are diagrams illustrating an exemplary process of an exemplary embodiment of the capacity modification service.
Figure 3B:
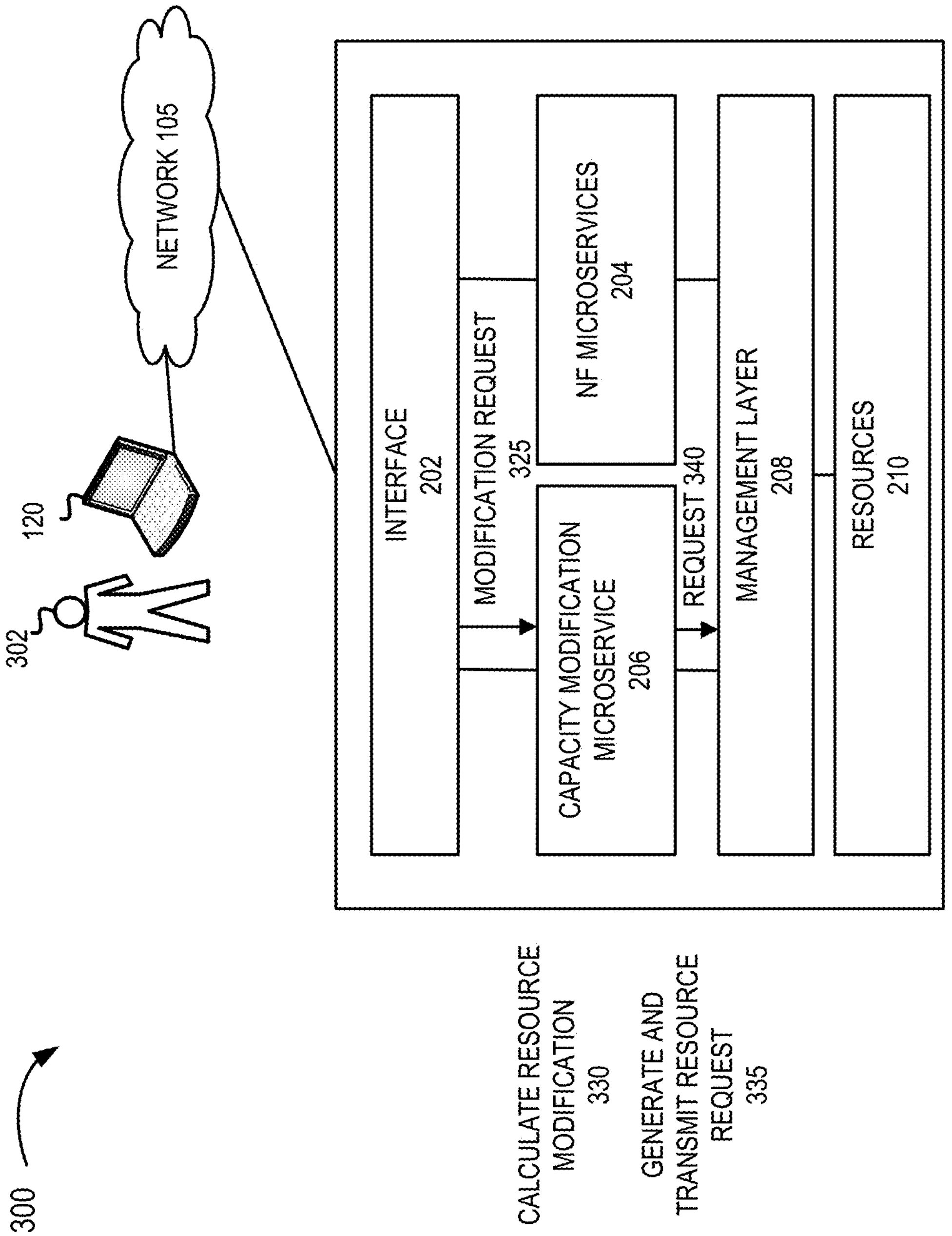
Figure 3C:
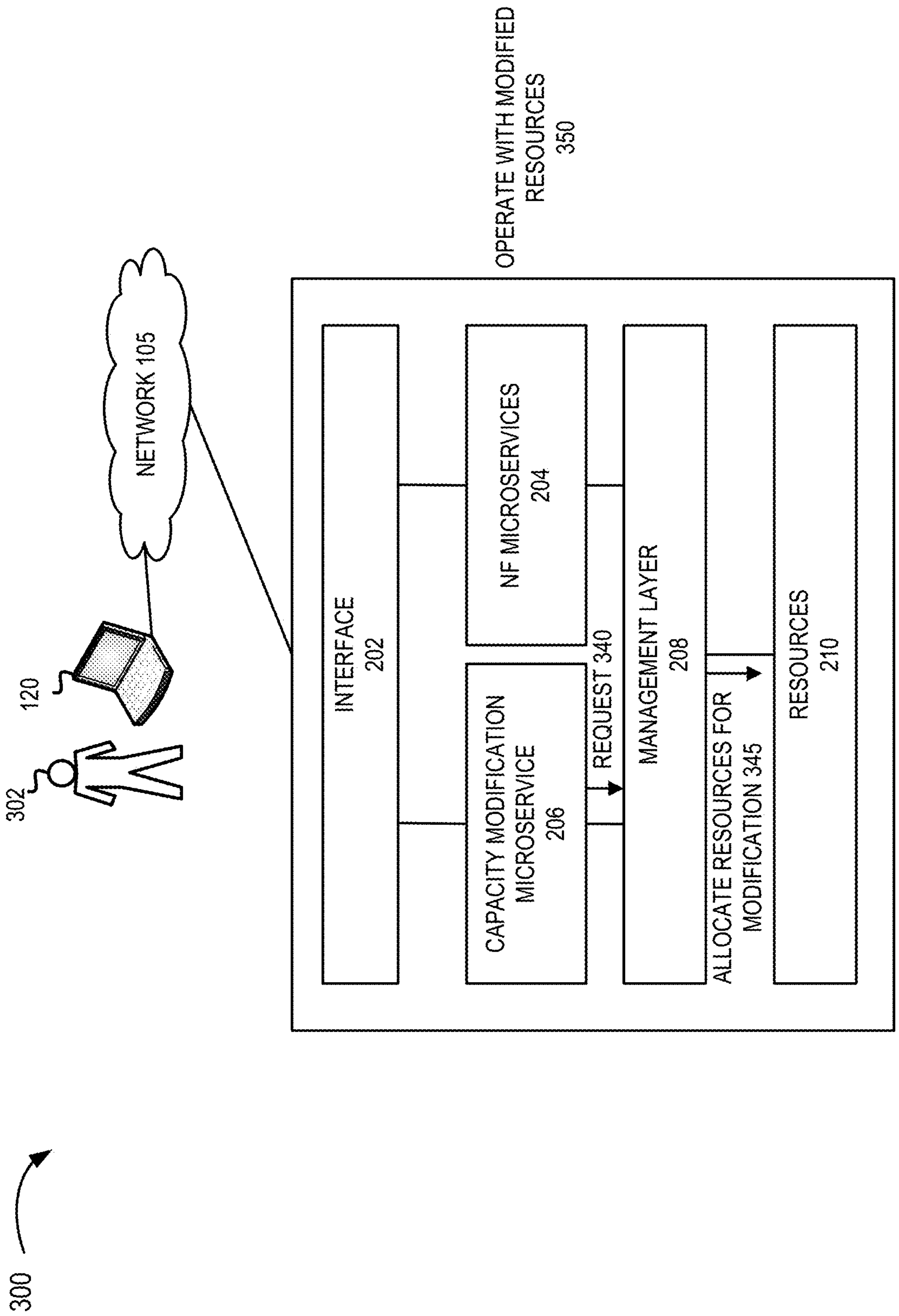

FIGS. 3A-3C are diagrams illustrating an exemplary process 300 of an exemplary embodiment of the capacity modification service. Referring to FIG. 3A, according to an exemplary scenario, a user 302 of end device 120 may wish to modify the amount of resources that are allocated to NF microservices 204. For example, due to an upcoming sporting event, a UPF of a 5G core network may be subject to an increase in user plane traffic. NF Microservices 204 may provide UPF functionality. As illustrated, user 302 via end device 120 may generate and transmit 305 a modification request to network device 110 via network 105. End device 130 may include a client that enables connection to interface 202. According to some exemplary embodiments, prior to transmission of a modification request 310, interface 202 and user 302/end device 120 may perform a security procedure (e.g., authentication, authorization, etc.). According to another exemplary scenario, an artificial intelligence/machine learning device (not illustrated) may receive prospective load information (e.g., the upcoming sporting evet) and generate the modification request based on such information.

Modification request 310 may include a request to modify the current amount of resources allocated/used by the UPF/network device 110. For example, modification request 310 may indicate a prospective network load criteria value that may relate to an amount of user plane traffic/over time, a number of PDU sessions, a number of QoS flows, a number of user plane connections, or another type of prospective load indicator. Modification request 310 may include date and time information (e.g., duration, start date and time, stop date and time, etc.) pertaining to the resource modification, as described herein. Modification request 310 may also include a name, an identifier, and/or a network address associated with a container, an NF, a pod, a node, and/or a microservice of microservice 206. Modification request 310 may also include similar information associated with NF microservices 204 to which modification request 310 pertains.

As further illustrated, interface 202 may receive 315 modification request, and identify and transmit 320 the modification request to the appropriate microservice (e.g., microservice 206). Referring to FIG. 3B, microservice 206 may receive a modification request 325 from interface 202 and identify the microservice to which modification request 325 pertains. Based on the prospective network load criteria value, microservice 206 may calculate a resource modification 330. According to this exemplary scenario, microservice 206 may perform a lookup of resource correlation information in which resource values may be obtained.

According to some exemplary embodiments, microservice 206 may store and manage modification requests. For example, microservice 206 may store current resource allocations for NF microservices 204. In this way, microservice 206 may calculate a prospective increase or decrease of resources relative to current resource allocation values. According to other exemplary embodiments, microservice 206 may calculate the prospective increase or decrease of resources without regard to current resource allocation values. Microservice 206 may also store requested start and stop times or the like relating to the time information associated with a modification request.

In response to the calculation of the prospective resource values, microservice 206 may generate and transmit 335 a resource request to management layer 208. For example, request 340 may include prospective resource values pertaining to resources upon which NF microservices 204 may use to run/operate. Request 340 may also include time or other information pertaining to the resource modification, as described herein. Referring to FIG. 3C, in response to receiving request 340, management layer 208 may allocate resources to support the requested resource modification 345. For example, management layer 208 may reserve or assign resources (e.g., processor, memory, storage, etc.) of resources 210 to be used or available for use by NF microservices 204 according to the time information associated with request 340. According to this exemplary scenario, when the sporting event occurs, NF microservices 204 may operate with the modified amount of resources (e.g., increase of resources 210).

Figure 4:
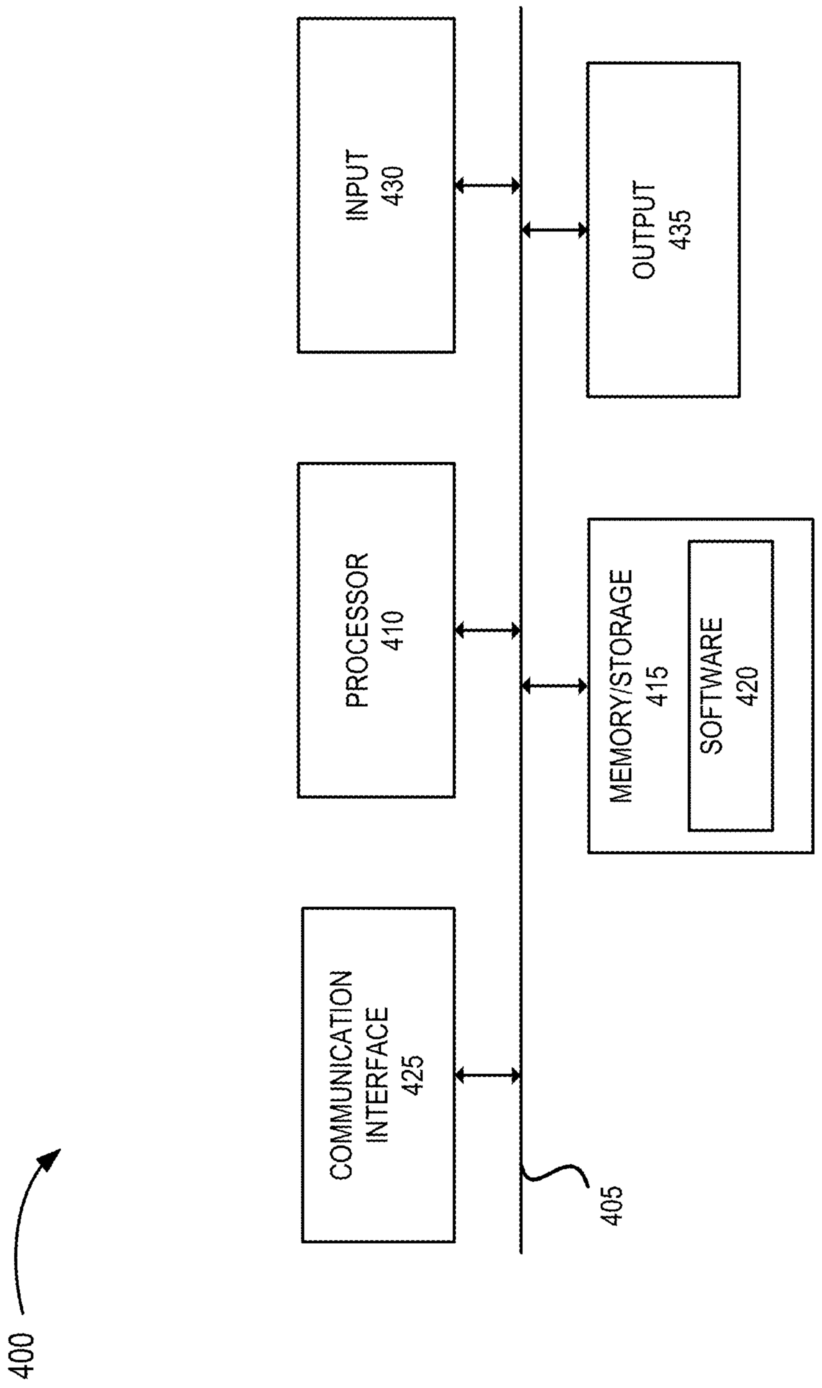
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to components included in network device 110 and end device 120. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc. Processor 410 may also be implemented as a multiprocessor system.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to network device 110, software 420 may include an application that, when executed by processor 410, provides the functions of the capacity modification service, as described herein. Software 420 may also include firmware, middleware, microcode, hardware description language (HDL), and/or other form of instruction. Software 420 may further include an operating system (OS) (e.g., Windows, Linux, OpenStack, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna, a communication port, and/or a buffer. Communication interface 425 may include various processing logic or circuitry (e.g., multiplexing/de-multiplexing, filtering, amplifying, converting, error correction, application programming interface (API), etc.). Communication interface 425 may be implemented as a reference point interface, a service-based interface, an Open Radio Access Network (O-RAN) interface, a Fifth Generation (5G) interface, another generation of interface (e.g., 5.5G interface, a 6G interface, a 7G interface, etc.), or some other type of interface (e.g., a MEC server interface associated with a MEC network, etc.).

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As described herein, device 400 may be implemented as a virtualized device. For example, device 400 may be instantiated, created, deleted, or some other operational state during its life-cycle (e.g., refreshed, paused, suspended, rebooting, or another type of state or status), using well-known virtualization technologies. For example, device 400 may be implemented as network device 110, such as a network device of a RAN, a network device of a core network, a network device of an application layer network, and/or another type of network device or end device 120 that may be a virtualized device and may include the capacity modification service, as described herein.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
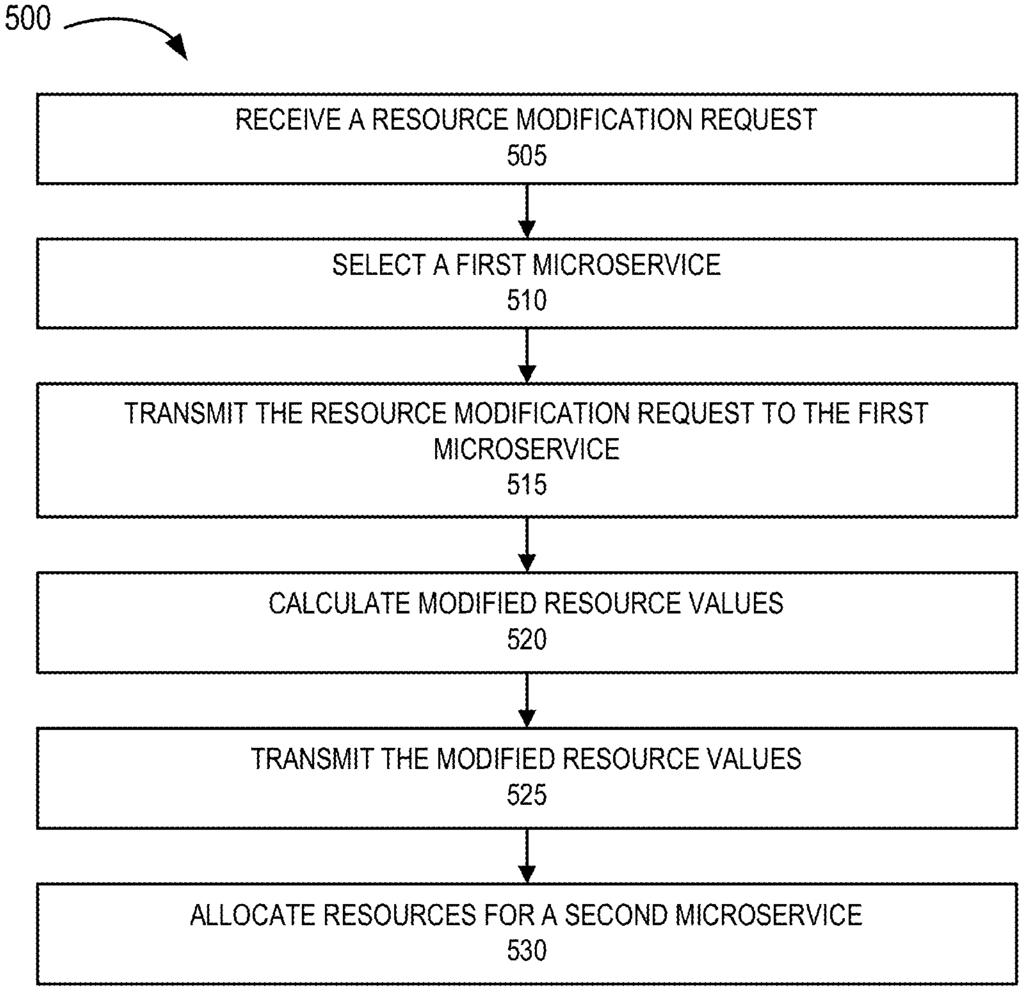
FIG. 5 is a flow diagram illustrating an exemplary process of an exemplary embodiment of the capacity modification service.

FIG. 5 is a flow diagram illustrating an exemplary process 500 of an exemplary embodiment of the capacity modification service. According to an exemplary embodiment, network device 110 may perform steps of process 500. For example, processor 410 executes software 420 to perform the steps illustrated in FIG. 5, and described herein. According to an exemplary embodiment, microservice 206 may perform at least some steps of process 500.

Referring to FIG. 5, in block 505, a resource modification request may be received. For example, interface 202 may receive the resource modification request from end device 120 associated with user 302, as described herein.

In block 510, a first microservice may be selected. For example, interface 202 may select capacity modification microservice 206 based on a name, a network address, and/or identifier of capacity modification microservice 206 which may be included in the resource modification request. In block 515, interface 202 may transmit the resource modification request to the first microservice. For example, interface 202 may communicate the resource modification request to capacity modification microservice 206.

In block 520, modified resource values may be calculated. For example, the first microservice (e.g., capacity modification microservice 206) may calculate modified resource values based on the resource modification request. According to an exemplary embodiment, the first microservice may perform a lookup that maps or correlates a network load criterion to resource values associated with resources (e.g., processor, memory, storage, buffer, communication interface, etc.) upon which a second microservice (e.g., NF microservices 204) may operate or run. According to another exemplary embodiment, the first microservice may calculate the modified resource values based on a formula or expression that may convert or translate the network load criterion value to resource values. The first microservice may calculate the modified resource values based on a resource limit configuration value or a reserve value, as described herein. The first microservice may include calculating a number of microservices, pods, containers, and/or nodes of the second microservice to be increased or decreased depending on the capacity modification request.

In block 525, the modified resource values may be transmitted. For example, the first microservice may transmit a request, which may include the calculated resource values, to management layer 208. The request may include other parameters relating to the resource modification, such as start and/or stop times, an open-ended time, and so forth, as described herein. The request may further include a number of microservices, pods, containers, nodes, and/or the like to support the capacity modification request.

In block 530, the resources for a second microservice may be allocated. For example, management layer 208 may reserve and/or allocate resources (e.g., increase, decrease) for the second microservice based on the received request. Management layer 208 may allocate the resources of resources 210 for a specified time period or until a new modification request is received, for example. Management layer 208 may increase or decrease the number of microservices, NFs, containers, pods, nodes, and/or the like associated with the second microservice (e.g., NF microservices 204). As an example, management layer 208 may increase the number of microservices that provide AMF, UPF, or gNB functionalities.

Although FIG. 5 illustrates an exemplary process 500 of the capacity modification service, according to other embodiments, process 500 may include additional operations, fewer operations, and/or different operations than those illustrated in FIG. 5, and described herein. For example, process 500 may further include that the second microservice uses the modified allocation of resources during its operation or running thereof.

As set forth in this description and illustrated by the drawings, reference is made to "an exemplary embodiment," "an embodiment," "embodiments," etc., which may include a particular feature, structure, or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A method performed by a processor of a device comprising:

providing, by the device that hosts a first virtual entity, a second virtual entity, a user interface that directly connects to and is an interface of the first virtual entity and the second virtual entity, and a management layer, a service that enables a user to modify resources, which include physical resources of the device, allocated for the second virtual entity via the first virtual entity that connects to the management layer, wherein the first virtual entity and the second virtual entity are each implemented as a container;

receiving, by the user interface of the device from the user, a request to modify the resources allocated to the second virtual entity according to a prospective network load criterion value included in the request;

transmitting, by the user interface to the first virtual entity, the request;

calculating, by the first virtual entity based on the request, resource values to be allocated for the second virtual entity, wherein the calculating includes converting the prospective network load criterion value to prospective resource values based on a lookup table or a formula, and wherein the calculating includes calculating a number of containers of the second virtual entity to be increased or decreased based on the request;

transmitting, by the first virtual entity to the management layer that includes a container orchestrator of the device, the calculated resource values; and allocating, by the management layer, first resources for the second virtual entity based on the calculated resource values, wherein the allocation of the first resources for the second virtual entity comprises:

increasing or decreasing, by the management layer based on the allocating, the number of containers associated with the second virtual entity in advance of a prospective network load to reduce a lag in capacity adjustment;

running, by the container orchestrator of the management layer, one or more containers associated with the second virtual entity based on the increasing or decreasing; and processing, by the one or more containers associated with the second virtual entity, a network function (NF) microservice to provide a core network function or a radio access network function.

2. The method of claim 1, wherein the request includes a start time and an end time for the first resources to be allocated.

3. The method of claim 1, wherein the prospective network load criterion value indicates a number of prospective sessions or a number of prospective connections.

4. The method of claim 1, wherein the request includes a first identifier of the first virtual entity and a second identifier of the second virtual entity.

5. The method of claim 1, further comprising:

calculating, by the first virtual entity, the resource values based on a resource limit configuration value.

6. The method of claim 1, wherein the request includes a prospective time period during which the prospective network load criterion value pertains.

7. The method of claim 1, wherein the first resources include a processor, a memory, a storage, and a communication interface.

8. The method of claim 1, wherein the user interface includes an application programming interface (API) server.

9. A device comprising:

a user interface;

a first virtual entity;

a second virtual entity;

a management layer; and a processor configured to:

provide, by the user interface that directly connects to and is an interface of the first virtual entity and the second virtual entity, a service that enables a user to modify resources, which include physical resources of the device, allocated for the second virtual entity via the first virtual entity that connects to the management layer, wherein the first virtual entity and the second virtual entity each implemented as a container;

receive, by the user interface from the user, a request to modify the resources allocated to the second virtual entity according to a prospective network load criterion value included in the request;

transmit, by the user interface to the first virtual entity, the request;

calculate, by the first virtual entity based on the request, resource values to be allocated for the second virtual entity, wherein the calculating includes converting the prospective network load criterion value to prospective resource values based on a lookup table or a formula, and wherein the calculating includes calculating a number of containers of the second virtual entity to be increased or decreased based on the request;

transmit, by the first virtual entity to the management layer that includes a container orchestrator of the device, the calculated resource values; and allocate, by the management layer, first resources for the second virtual entity based on the calculated resource values, wherein the allocation of the first resources for the second virtual entity comprises:

increase or decrease, by the management layer based on the allocating, the number of containers associated with the second virtual entity in advance of a prospective network load to reduce a lag in capacity adjustment;

run, by the container orchestrator of the management layer, one or more containers associated with the second virtual entity based on the increasing or decreasing; and process, by the one or more containers associated with the second virtual entity, a network function (NF) microservice to provide a core network function or a radio access network function.

10. The device of claim 9, wherein the request includes a start time and an end time for the first resources to be allocated.

11. The device of claim 9, wherein the prospective network load criterion value indicates a number of prospective sessions or a number of prospective connections.

12. The device of claim 9, wherein the request includes a first identifier of the first virtual entity and a second identifier of the second virtual entity.

13. The device of claim 9, wherein the processor is further configured to:

calculate, by the first virtual entity, the resource values based on a resource limit configuration value.

14. The device of claim 9, wherein the request includes a prospective time period during which the prospective network load criterion value pertains.

15. The device of claim 9, wherein the first resources include a first processor, a memory, a storage, and a communication interface.

16. The device of claim 9, wherein the user interface includes an application programming interface (API) server.

17. A non-transitory computer-readable storage medium storing instructions executable by a processor of a device that hosts a first virtual entity, a second virtual entity, a user interface that directly connects to and is an interface of the first virtual entity and the second virtual entity, and a management layer, which when executed cause the device to:

provide, by the user interface, a service that enables a user to modify resources, which include physical resources of the device, allocated for the second virtual entity via the first virtual entity that connects to the management layer, wherein the first virtual entity and the second virtual entity are each implemented as a container;

receive, by the user interface from the user, a request to modify the resources allocated to the second virtual entity according to a prospective network load criterion value included in the request;

transmit, by the user interface to the first virtual entity, the request;

calculate, by the first virtual entity based on the request, resource values to be allocated for the second virtual entity, wherein the calculating includes converting the prospective network load criterion value to prospective resource values based on a lookup table or a formula, and wherein the calculating includes calculating a number of containers of the second virtual entity to be increased or decreased based on the request;

transmit, by the first virtual entity to the management layer that includes a container orchestrator of the device, the calculated resource values;

allocate, by the management layer, first resources for the second virtual entity based on the calculated resource values, wherein the allocation of the first resources for the second virtual entity comprises:

increase or decrease, by the management layer based on the allocating, the number of containers associated with the second virtual entity in advance of a prospective network load to reduce a lag in capacity adjustment;

run, by the container orchestrator of the management layer, one or more containers associated with the second virtual entity based on the increasing or decreasing; and process, by the one or more containers associated with the second virtual entity, a network function (NF) microservice to provide a core network function or a radio access network function.

18. The non-transitory computer-readable storage medium of claim 17, wherein the request includes a first identifier of the first virtual entity and a second identifier of the second virtual entity.

19. The non-transitory computer-readable storage medium of claim 17, wherein the prospective network load criterion value indicates a number of prospective sessions or a number of prospective connections.

20. The non-transitory computer-readable storage medium of claim 17, wherein the user interface includes an application programming interface (API) server.

* * * * *